United States Patent [19]

Newman et al.

[11] Patent Number: 4,786,295
[45] Date of Patent: Nov. 22, 1988

[54] FILTRATION DEVICE FOR AIRBORNE CONTAMINANTS

[75] Inventors: Eugene E. Newman, Maple Shade; Anthony Natale, Mt. Holly; Thomas Natale, Moorestown, all of N.J.

[73] Assignee: GPAC, Inc., Maple Shade, N.J.

[21] Appl. No.: 103,477

[22] Filed: Oct. 1, 1987

[51] Int. Cl.⁴ .............................................. B01D 46/00
[52] U.S. Cl. .......................................... 55/213; 55/270; 55/271; 55/274; 55/471; 55/472; 340/607
[58] Field of Search .................... 55/21, 213, 271, 272, 55/274, 471, 472; 340/607, 614, 639

[56] References Cited

U.S. PATENT DOCUMENTS 4,202,676  5/1980  Pelosi et al. ...................... 55/472 X
4,610,703  9/1986  Kowalczuk ............................ 55/274
4,666,470  5/1987  Verduyn et al. ........................ 55/20

Primary Examiner—Charles Hart
Attorney, Agent, or Firm—Fleit, Jacobson, Cohn & Price

[57] ABSTRACT

A filtration device for filtering airborne contaminants, such as airborne asbestos fibers, from the air, including a housing having an inlet for receiving contaminated air, an outlet for expelling filtered air outside of the housing, a filter, including a HEPA filter, in sealed communication with the inlet, and a blower within the housing for drawing air through the filter means and for expelling the filtered air through the outlet to the outside of the housing. A control and display system continuously senses differential air pressure within the housing and blower speed, converts the differential air pressure and blower speed to an air flow rate value and displays the air flow rate through a display unit. Manually controllable key pad switches are provided to selectively change the desired air flow rate, to set upper and lower pressure limit values, and to set the operating time for the system operation. When the system is set to operate at an air flow rate below the maximum air flow rate, the system automatically and continuously maintains the air flow rate at the selected value.

16 Claims, 7 Drawing Sheets

FILTRATION DEVICE FOR AIRBORNE CONTAMINANTS

CROSS-REFERENCE TO RELATED CASES

This application is related to U.S. Pat. No. 4,604,111, and U.S. patent application Ser. No. 084,763, filed on Aug. 13, 1987.

BACKGROUND OF THE INVENTION

The present invention relates to a filtration device for filtering and removing airborne contaminants, such as airborne asbestos fibers. During the process of removing asbestos material from a building, the work area in which the asbestos is contained is subject to substantial airborne asbestos contaminants that are hazardous not only to the workers involved in the asbestos removal process, but hazardous to the outside environment if allowed to escape from the work area. As described in U.S. Pat. No. 4,604,111, a system and method for removing asbestos is known which minimizes the airborne contamination within the work area and prevents the escape of contaminated air outside of the work area in which the asbestos is removed. This system and method, known as the negative pressure method, provides for defining a work area that is substantially sealed but having an opening in the work area so that relatively large volumes of air can be drawn into the work area by a filtration device, which device filters the air and then exhausts the cleansed air outside of the work area. The filtration device, as described in the above-mentioned patent, must be capable of drawing relatively high volumes of air into the work area, thus creating a negative pressure in the work area to prevent any airborne asbestos fibers from leaking outside of the work area. By drawing relatively large volumes of air into the work area, the work area is substantially "cleansed" thus minimizing the airborne asbestos fibers within the work area to prevent contamination to the workers. The filtration device, as described in the above patent, includes a housing having a blower for drawing air into the housing through an air inlet, and filtering the air through filters located within the housing. After the air is filtered, the air is expelled outwardly from the housing, preferably through a hose arrangement that is associated with a wall of the enclosed work area to allow the cleansed air to exit the work area. Various types of filters are used with such filtration device, particularly a HEPA type filter which maximizes the removal of the airborne asbestos fibers.

Prior art filtration devices used in connection with asbestos removal procedures are known in the art. In addition to the filtration device as described in U.S. Pat. No. 4,604,111, filtration devices, or units, have been manufactured and sold by Micro-Trap, Inc., as well as other entities. The Micro-Trap filter units include a housing having an inlet for receiving contaminated air and an outlet for expelling the filtered air to the exterior of the housing. A filter, including a HEPA filter, is installed in the housing in sealed communication across the air inlet. Downstream of the HEPA filter is a blower for drawing air through the filter and for expelling the filtered air through the air outlet to the outside of the housing.

Such units include a display and alarm panel for providing basic control and display functions. For example, such units may include an analog pressure gauge for providing a visual read-out of the differential pressure between the housing interior, downstream of the filter, and the exterior of the housing. Such pressure gauge includes two air inlets, one of which is in communication with the interior of the housing and the other of which is in communication with the exterior of the housing for receiving the atmospheric air. This differential air pressure is displayed on the pressure gauge located at a suitable control panel mounted on the side of the housing. The pressure gauge indicates this differential pressure, in inches of water (WG).

In addition, such units may include pressure switches which are pre-set to predetermined high and low pressure values. When the high and low pressure limits are exceeded, visual and audible indications are provided on the control panel. Still further, the units include a shut down timer that will enable the operator to set the blower motor to operate for a pre-set time period. An elapsed time meter is also provided to display the total operating time of the unit. Further, certain of such prior art units include a blower motor speed control knob to control the motor speed of the blower motor. None of the control/display features of such prior art systems are microprocessor controlled.

In order to optimize the effectiveness of filtration units in connection with asbestos removal within a substantially enclosed work area, the operating personnel need to be aware of, and be able to control, the air flow through the enclosed work area to assure optimum filtration and removal of the airborne asbestos contaminants. It is desirable that the operator of the filtration unit have a visual readout of the air flow rate through the filtration unit, in cubic feet per minute (CFM) and to provide for some means to alter or adjust the air flow rate depending upon the particular air flow requirements. Further, during the usage of any filtration unit, as the unit is used, the filters get clogged, thus altering the air flow rate through the system. Among the disadvantages of the above systems is the inability to provide a visual indication of the air flow rate in cubic feet per minute during system operation and to provide for some mechanism for automatically ensuring a stable air flow rate under all system conditions, i.e., as the filter becomes clogged with contaminants. Moreover, such units lack the ability to monitor various electrical characteristics, such as the incoming line voltage. Still further, such units do not lend themselves to remote monitoring and control, thus necessitating personnel having to enter the contaminated area to monitor or alter the operation of the units.

SUMMARY OF THE INVENTION

The present invention relates to a filtration device or unit having a novel microprocessor based control and display system. The filtration unit combines the known filtration unit elements (including a filtration unit housing having an inlet for receiving contaminated air and an outlet for expelling filtered air outside the housing, a filter or filter system within the housing, including a HEPA filter in sealed communication across the air inlet, a blower within the housing for drawing air through the filter and for expelling the filtered air through the outlet to the outside of the housing) with the novel control and display unit to control and display various operating characteristics of the system. Specifically, the control and display system continuously senses or detects the differential air pressure between the interior of the filtration unit housing and the atmosphere (i.e., the static pressure within the housing) downstream of the filter during the entire operating cycle of the unit. This differential air pressure is converted to an air flow rate, in cubic feet per minute (CFM), which air flow rate is visually displayed during the operating cycle. Instantaneous and average air flow readings are provided, thus enabling the operator of the unit to monitor the filtration unit output and thus monitor the air flow changes in the work area being treated.

The novel system of the present invention further enables an operator to change the air flow rate from a maximum rate to a lesser rate, and then continuously and automatically controlling the motor speed of the filtration unit blower to maintain the selected predetermined air flow rate. Thus, when operating conditions change, for example due to the clogging of the filter during unit operation, the system automatically increases the motor speed of the blower to maintain the air flow rate at a substantially constant value.

The present invention further provides for monitoring the line voltage that is applied to the filter unit blower motor to assure that a minimum voltage is provided to the blower motor. The line voltage may be visually displayed at the request of the operator. An audible alarm may also be activated when the line voltage is too low.

Further, the present invention provides for timing various operating characteristics of the filtration unit. For example, the system includes a timer for pre-setting the operating time of the unit and for displaying the amount of time that the unit has run in a particular operation. Still further, the system provides for a visual indication of the total operating time of the unit during its entire lifetime.

Thus, it is an object of the present invention to provide a filtration unit with a novel sense, display, and control system. It is further an object of the present invention to provide for monitoring and controlling the air flow rate during the operating cycle of the unit. Still further, the filtration unit of the present invention includes a control panel, with a key pad, to enable manual selection of desired air flow rates and operating times, as well as to provide instantaneous visual indication of various operating characteristics. The filtration unit also is capable of remote operation as part of a network of units, under control of a central controller, such as a personal computer.

These and other objects of the present invention will be apparent when reference is made to the following detailed description with accompanying drawings.

DESCRIPTION OF THE PREFERRED EMBODIMENTS

Figure 1:
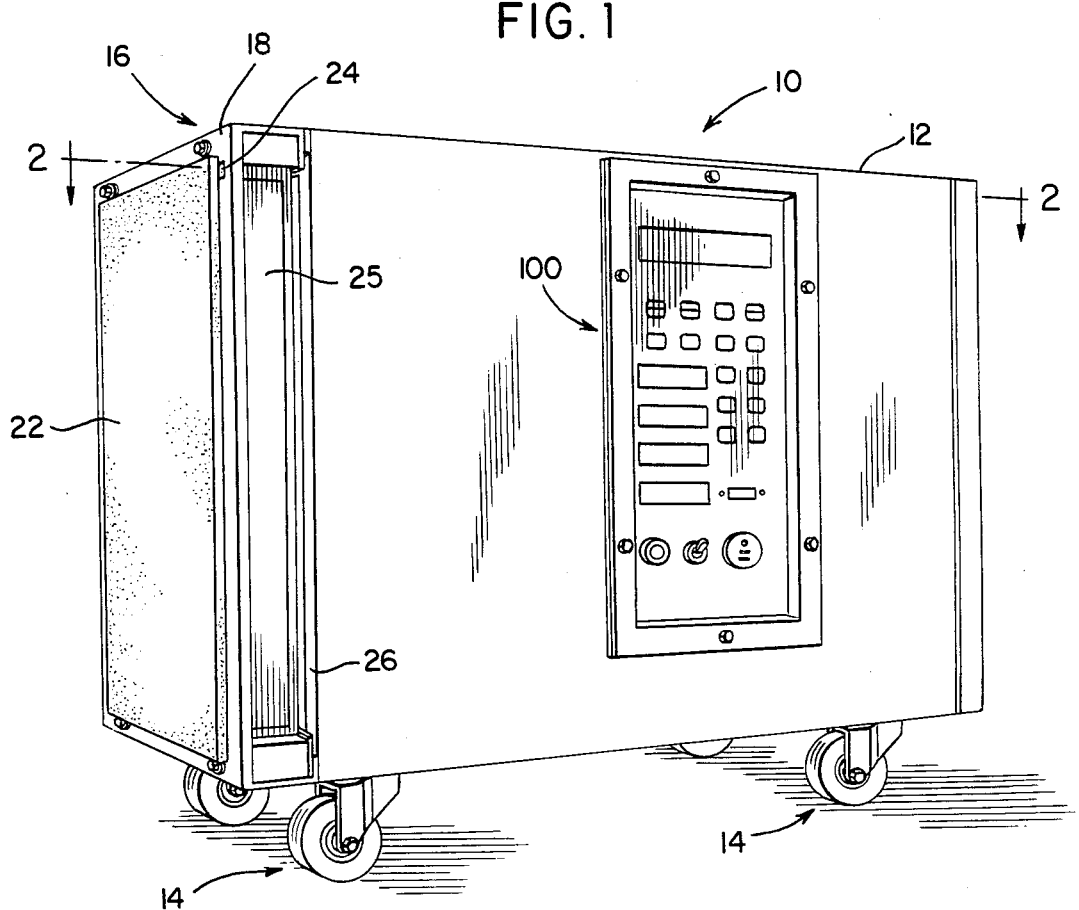
FIG. 1 is a perspective view of the filtration device of the present invention.
Figure 2:
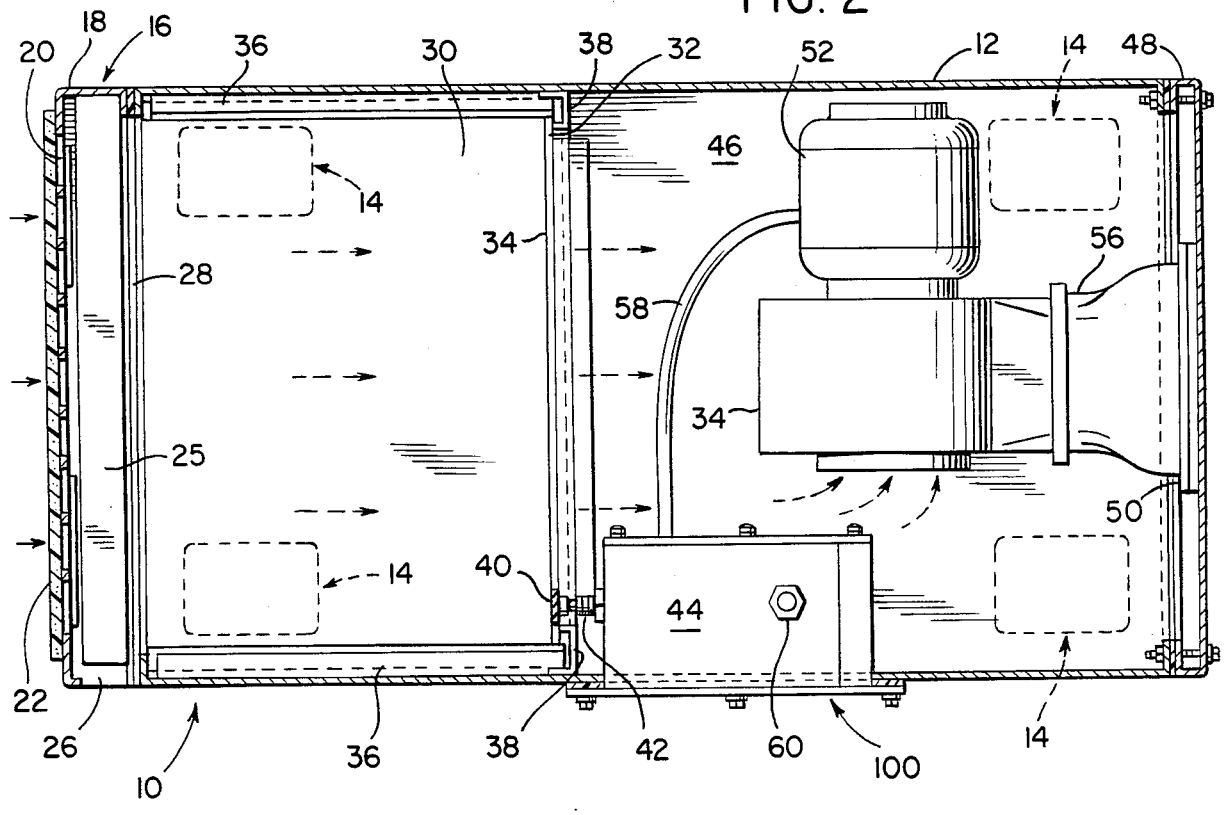
FIG. 2 is a top cross section of the filtration unit of FIG. 1.

The filtration unit 10, as depicted in FIGS. 1 and 2, includes a filtration unit housing 12 mounted on wheels 14. The housing 12 is impervious to air flow into the housing except through a series of filters disposed adjacent to air inlets when a blower is in operation, as will be described. The substantially air tight housing prevents any asbestos contaminated air from entering into the flow path of air which has already been filtered.

One end of housing 12 includes a filter holding assembly 16 which is bolted or otherwise secured to the main body of the housing 12 preferably through foam gaskets, not shown. The front wall 18 of the filter holding assembly 16 defines a first air inlet formed of perforations 20. Disposed over the wall 18 is a thick coarse filter 22 secured to the wall 18 by means of a Velcro (TM) strip 24. Behind the front panel 18, within a channel in the assembly 16, is a secondary finer filter 25 which slides into the opening 26 for easy replacement. The finer filter 25 is adjacent to a second air inlet 28.

Disposed within the housing 12 is a HEPA filter 30 which is sized to extend from the second inlet 28 to a rearward third inlet 32. The HEPA filter is generally box-shaped having a thick foam gasket 34 disposed around the back edges of the filter 30. The HEPA filter 30, as an example, has an efficiency of 99.97 percent for airborne particulate to 0.3 microns when 2000 CFM of air is moved at 1.1 inch pressure, water gauge (WG). L-shaped guide plates 36 are mounted to the side walls of the housing to guide the HEPA filter into its operating position. Stop plate brackets 38 mounted to the side, top and bottom walls of the housing co-act with the gasket 34 to provide an air tight seal between the stop plates 38 and the HEPA filter to assure that the HEPA filter is in sealed communication with the third air inlet 32, thus preventing any contaminated air from escaping around the extremities of the HEPA filter into the rearward portion 46 of the housing.

Mounted at the rearward face of the HEPA filter 30 is a filter switch interlock plate 40 which co-acts with a filter switch 42, associated with the control unit housing 44. When the HEPA filter 30 is properly positioned within the housing, in engagement with the stop plates 38, the plate 40 engages and pushes the filter switch 42 which is detected by the control circuitry within the housing 44 in a manner to be described further below.

The rear portion 46 of the housing 12 is defined by the top, bottom and side walls of the housing and a rear panel 48 having an air outlet opening 50 defined therein. As shown in FIG. 2, the rear panel 48 may be a separate panel that is bolted to flanges extending from the side, top, and bottom walls of the housing 12. Alternatively, the panel 48 may be integral with the side, top, and bottom walls to form a one-piece unit. If a separate rear panel 48 is employed, suitable sealing elements must be provided to assure that contaminated air does not leak into the housing rear portion 46.

Disposed within the rear portion 46 of the housing 12 is a blower motor 52 for driving a direct drive centrifugal fan blower 54 which draws air through the air inlets and through the filters and passes filtered air through a conduit 56 in communication with the air outlet opening 50. Alternatively, the outlet of the blower may be sealed directly to the rear panel of the housing. As described in U.S. Pat. No. 4,604,111, the air outlet, or exhaust may be connected with suitable duct work to exhaust filtered air outside of the substantially enclosed work area during the operation of the filtration unit in an asbestos removal process. The blower motor 52 and fan blower 54 must have size and power capabilities sufficient to enable sufficient air flow through the system in accordance with the intended operation of the filtration unit. For conducting removal of airborne asbestos contamination in a substantially enclosed work area, air moving capabilities of approximately 400 CFM up to 2200 CFM may be desirable. Optimally, the air flow rate must be capable of changing air within the work area approximately four times per hour.

Mounted in a side wall of the housing 12 is a control panel 100 bolted in sealed arrangement with the side panel. The control panel 100 is associated with the control housing 44. Cable or wires 58 connect the control unit 44 to the blower motor 52 to provide a source of electrical energy for the motor 52. Disposed on the control unit 44, in communication with the rear portion 46 of the housing 12, is an internal pressure port 60 which provides for the passage of air to a pressure sensor located in the housing 44, as will be described further below.

Other than the novel control panel 100, and the internal control and display circuitry that is located within the control panel housing 44, the above filtration system is known in the art. Indeed, the precise arrangement of the various elements discussed above is not critical other than that the housing must include an air inlet and an air outlet, the air inlet being in sealed communication with a filter, particularly a HEPA filter, wherein air is drawn through the filter/inlet by an electrically powered blower and wherein the filtered air drawn therein is expelled through an air outlet, or exhaust, of the housing. Thus, other than the novel control panel and internal circuitry associated therewith, the precise disposition of the various essential features as discussed above, may be different from that as depicted in FIGS. 1 and 2 without detracting from the inventive concept described herein.

Figure 3:
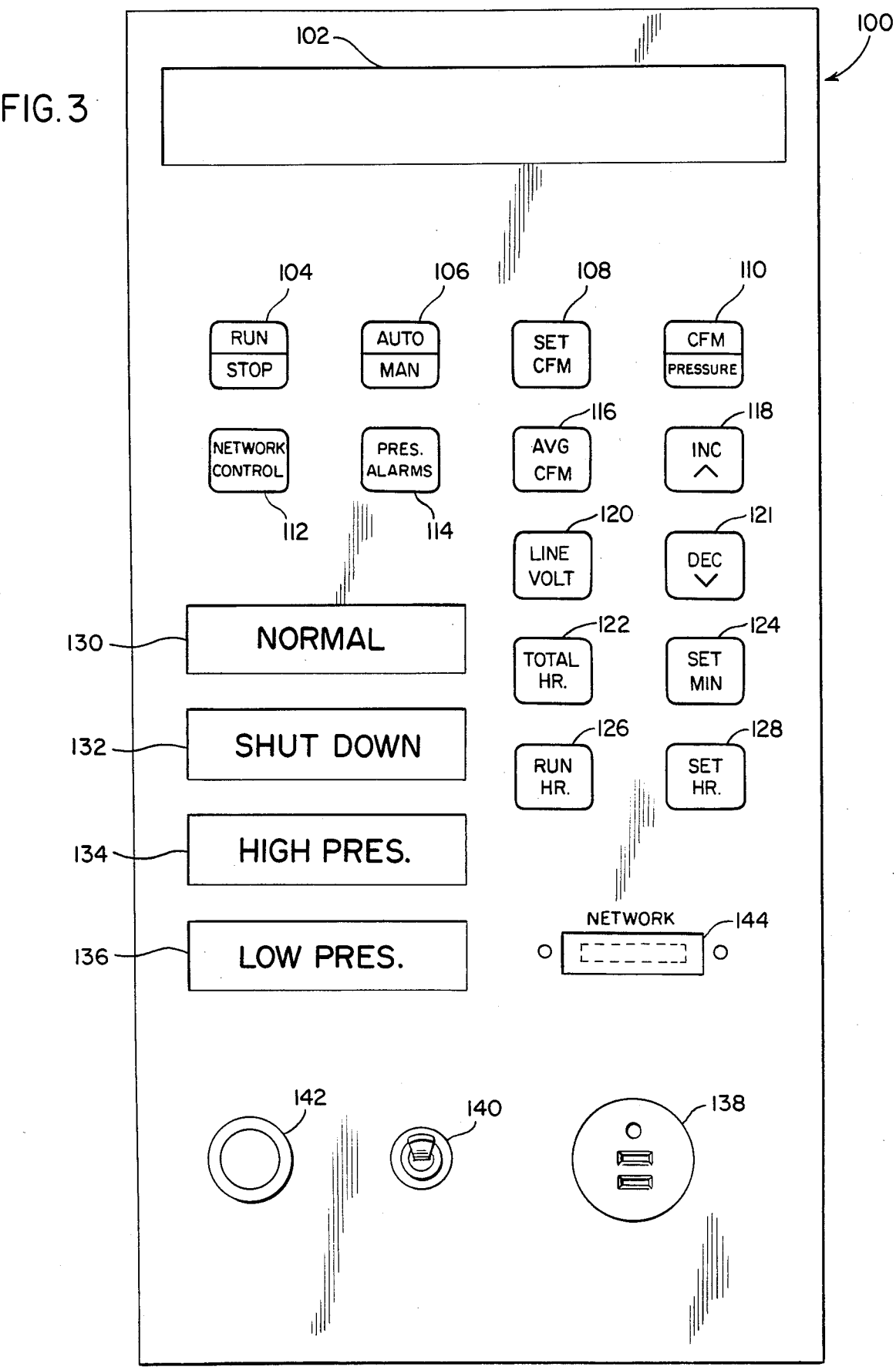
FIG. 3 is a drawing of the control panel of the filtration unit.

Turning to FIG. 3, the control panel 100 is shown in greater detail. The control panel 100 includes an alphanumeric plasma display unit 102 which provides for alphanumeric characters to be displayed for visual readout. The various messages that are displayable will be described further below in connection with the overall operation of the system. One such alphanumeric plasma display unit that may be employed is the Turbotics 2100 display unit.

The panel 100 further includes a plurality of membrane key pad switches 104-128. These key pad switches are manually operable to provide various control and display functions, to be described below. The front panel also includes four annunciator panels 130-136 which are translucent masks with indicia indicating "normal", "shut-down", "high-pressure" and "low-pressure" respectively. Positioned behind the masks are incandescent lights which are lit under control of the circuitry to be described.

The control panel 100 further includes a power cable plug 138 which is adapted to receive a power cable connected to a 120 volt outlet. Toggle switch 140 is also provided, which turns the control panel on or off. When turned on, the system powers up in a manner as will be described. The toggle switch 140 is also connected with a circuit breaker (not shown) to activate the switch to toggle off when the amperage for the circuit breaker is exceeded. The control panel 100 also includes a pressure port 142, which allows air to pass from the environment surrounding the filtration unit via a tubing (not shown) to a pressure sensor, as will be described further below.

Finally, the control panel 100 includes a cable outlet 144, labelled "Network" for coupling the control circuitry to a central or master controller, such as a personal computer (not shown), via a multiplexer (not shown) to enable a plurality of filtration units to be controlled from the central controller. In essence, the central controller can replicate substantially the same functions as the various key pad elements of the panel 100, thus allowing the filtration unit to be controlled from a remote location. It is contemplated that a plurality of filtration units, either within a single work area, or even in multiple work areas, can be controlled from the central controller by a single operator. Moreover, the central controller can compile data from any or all of the filtration units and can process the data, print the data, and store the data on floppy discs. Further, the central controller may be programmed to automatically activate additional filtration units located in a work area when additional air moving capacities may be required. Still further, the central controller can be connected with a transmitting pressure sensing device, such as a Micro-Monitor (TM) device manufactured by Micro-Trap, so as to automatically activate or shut down additional air filtration units upon sensing various pressures in the work area.

The various functions of the key pad elements 104-128 will be briefly described. The RUN/STOP switch 104 when manually actuated or depressed, will alternate between a run and a stop condition. When activated to a run condition, the system will connect the line voltage to the blower motor, through a motor speed control to be described, to enable the blower motor to run at maximum motor speed. This enables the unit to operate at its maximum air flow rate. The display unit 102 may display suitable indicia, such as "system running" and display the air flow rate in CFM. Obviously other display indicia can be programmed.

The AUTO/MAN key pad switch 106 will alternate between an automatic mode and a manual mode when depressed by the operator. The unit may be placed in an automatic mode, which means that the filtration unit motor will operate for a time period either as selected by the operator, in a manner to be described, or to a predetermined default value, typically twelve hours. When the auto button 106 is pressed, the display unit 102 will display the amount of time that is set for the unit to run. If it is desired that the system run for less than its predetermined default time, the key pad button 106 is depressed to place the unit in the automatic mode, then the "set hour" button 124 is depressed to set the hour, and then the operator depresses the INC switch 118 or the DEC switch 121 to increment or decrement, respectively, the time period that the operator wants the unit to run. If the automatic setting is not desired, the key pad 106 is depressed to its manual mode in which case the system keeps running without any time limitation. In such case, when the operator wants to stop the unit, he presses the key pad 104.

Key pad switch 108, titled "SET CFM" may be depressed by the operator to set the air flow rate. When depressed, the display unit 102 provides a visual readout of the current or instantaneous air flow rate in CFM. If the operator wants to set the air flow rate to a value other than that presently established, the operator keeps the switch 108 depressed while at the same time actuating the increment or decrement switches 118 or 121 to set the desired CFM value. The CFM values that are set will be displayed on the display unit 102.

The key pad switch 110, entitled "CFM/PRESSURE" may be depressed by the operator to provide a visual read out of either the current air flow rate, in CFM, or the differential pressure, in inches of water.

The "NETWORK CONTROL" switch 112 is provided to connect the internal circuitry to the control of a master controller, such as a personal computer, via the network terminal 144 as described above.

The key pad switch 114, entitled "PRES ALARMS", when depressed by the operator, will enable display of the predetermined high and low pressure limits that have been programmed in the system memory. Typically, the predetermined low pressure value is 0.70 WG and the predetermined high pressure value is 2.60 WG. When the differential pressure that is detected is higher than 2.60, the high pressure annunciator light 134 is activated; when the pressure falls below 0.70, the low pressure annunciator light 136 is activated, and the system will shut down. In both cases, an audible alarm (not shown) may be activated. If the operator desires to change the upper and lower pressure limits, the operator depresses key pad switch 114 down and then increments and decrements the pressure limits to set the desired pressure limits. The pressure limits will be displayed on the display unit 102 when the pressure alarm switch 114 is depressed. These will alternate between high pressure values and low pressure values.

The "AVG.CFM" switch 116, when activated, will display the average flow rate that exists from power up of the system, if the switch 110 is set in the CFM mode. The average flow rate, in CFM, will then be displayed on the display unit 102. If the switch 110 is in the pressure mode, the average pressure will be displayed when the switch 116 is pressed.

The "LINE VOLT" switch 120, when activated, will read the line voltage coming into the system (via plug 138) and display the line voltaqe on the display unit 102.

The "SET MIN" switch 124 and "SET HOUR" switch 128, may be activated in conjunction with the auto switch 106 and the increment and decrement switch 118 and 121 to set the shut down time in hours and minutes. For example, when the auto switch 106 is set to place the system in the auto mode, the set hour switch 128 is then depressed, and the increment and decrement switches 118 and 121 are selected to change the hour. The set minute switch 124 operates in a similar manner.

The "RUN HOUR" switch 126 may be selected by the operator to display the amount of time that the unit has run in its particular operating cycle.

The "TOTAL HOUR" switch 122 is used to provide a visual read out on the display unit 102 of the total hours that the filtration unit has been in operation since its initial activation.

Turning to the annunciator lights 130-136, the "normal" light 130 will be lit when the blower motor is on. The "shut down" light 132 will be activated when the electronic system is active (i.e., the toggle switch 140 is actuated) but before the motor is actuated. The high pressure 134 and low pressure 136 lights indicate when the pre-determined high and low pressure values have been exceeded, as discussed above.

Figure 4:
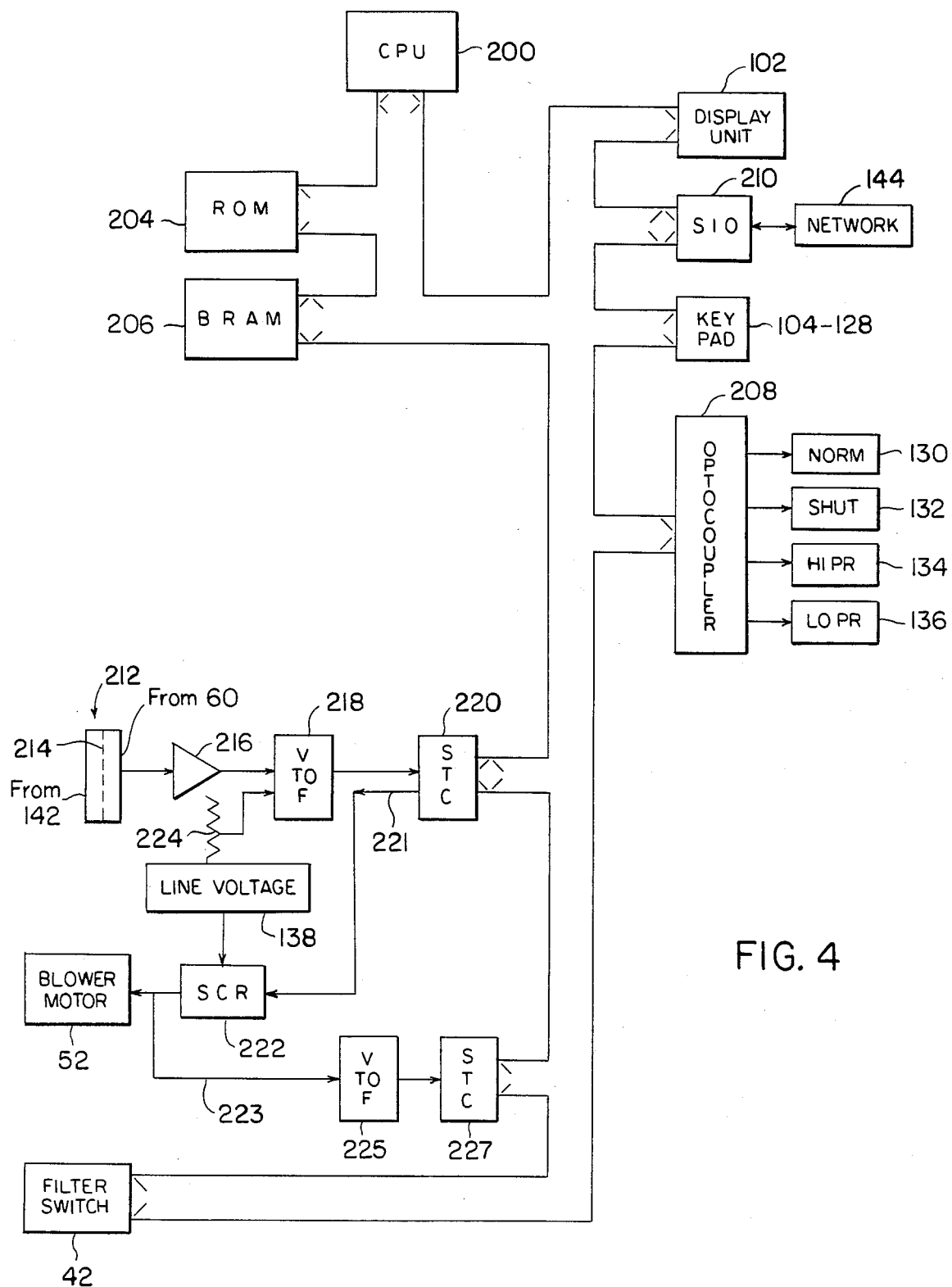
FIG. 4 depicts the microprocessor-based electrical system of the present invention.

The electronic circuitry for operating the system will now be described. As depicted in FIG. 4, the electronic system includes a central processing unit (CPU) 200, such as a Zilog Z80 processor connected via a conventional data/address bus 202 to the various input and output elements as will be described. Coupled to the CPU via the data/address bus 202 is a read only memory 204 to provide program instructions and to store various pre-determined system values. The read only memory is a 16K×8 memory. Also coupled with the CPU, via the data/address bus 202, is a battery powered random access memory, or "BRAM", 206 having 8K×8 capacity.

The display unit 102 and the key pad switches 104-128 are similarly coupled with the CPU 200 over the data/address bus 202. The annunciator lights 130-136 are coupled to the data/address bus 202 via an optocoupler 208, which is a conventional optical isolator. In addition, the "network" cable connector, or receptacle, 144 is coupled to the data/address bus 202 via a serial input/output controller (SIO) 210, such as a Mostek MK 3884 controller, which converts the data over the data/address bus 202 into a serial output to the network receptacle 144. Similarly, serial data input from the network receptacle 144 is converted via the SIO 210 to parallel format for communication with the CPU 200, in a conventional manner.

One of the inputs to the system is a pressure sensor 212 which, preferably, is a piezoelectric pressure sensor, that senses the differential pressure between the interior of the filtration unit housing (from pressure port 60) and the environment outside of the filtration unit housing (from pressure port 142). The pressure sensor 212 includes a diaphragm 214 which is mechanically deflected or deformed by the differential air pressure between the pressure ports 60 and 142. Such pressure sensors are well known in the art. Typically the pressure sensor should be chosen to measure plus or minus five inches (water gauge). The pressure sensor 212 is physically located within the housing 44, as is all of the electronic circuit elements described herein.

The piezoelectric pressure sensor 212 provides, as is well known, an analog voltage output having a value representative of the differential pressure, to an operational amplifier 216, the output of which is provided as an input to a voltage to frequency converter 218. The frequency output of the voltage to frequency converter 218 is provided as an input to a multiple port system timer controller (STC) 220, such as an Advanced Microdevices AMD 9513. The STC 220 acts as an interface with the data/address bus 202. As is well known, the STC 220 converts the frequency input to a hexadecimal code onto the data/address bus 202; similarly code on the data/address bus 202, when provided as an input to the STC 220, provides a frequency output at 221. Thus, the differential pressure sensed by the piezoelectric transducer 212 is converted to hexadecimal code and provided to the data/address bus 202 via the STC 220.

The blower motor 52, as shown in FIG. 4, is coupled to a line voltage source via plug 138, through a motor speed control such as an SCR 222 to provide electrical power to the blower motor 52. The motor speed control SCR 222 is pulsed at a particular frequency rate by a signal from the STC 220, via line 221, under control of the CPU 200. That is, the CPU 200 writes data to the STC 220 which converts the code to a frequency output to pulse the SCR 222 at the desired frequency corresponding to the instructions from the CPU. This type of motor speed control is conventional.

The voltage that is actually provided to the blower motor 52 may be read by the CPU 200 via line 223. Line 223 provides the voltage to a voltage to frequency converter 225. The frequency output of the converter 225 is provided to an STC 227, which converts the frequency to code for reading by the CPU 200 via the data/address bus 202. The STC 227 may be the same as the STC 220; indeed only a single STC may be provided to perform the functions of both STC 220 and STC 227.

The reading of the actual voltage (or power, current, or other electrical characteristic, if desired) provided to the blower motor provides a technique for determining the blower motor speed in RPM. That is, the speed of an electrical motor is related to the voltage provided to the motor. By reading the voltage (or other electrical characteristic), the CPU can determine the motor speed, in RPM, of the blower motor 52.

The line voltage 138 is connected, via a voltage divider network 224, to the input of the voltage to frequency converter 218 which, in turn, is coupled to the STC 220. Thus, the line voltage is converted to a frequency, which is, in turn, converted by the STC 220 to a code for reading by the CPU 200 via the data/address bus 202.

The filter switch 42, as previously described, provides a logical high signal directly to the bus 202 when the HEPA filter is properly positioned in the housing. This signal is read by the CPU 200 in a manner to be described.

Figure 5:
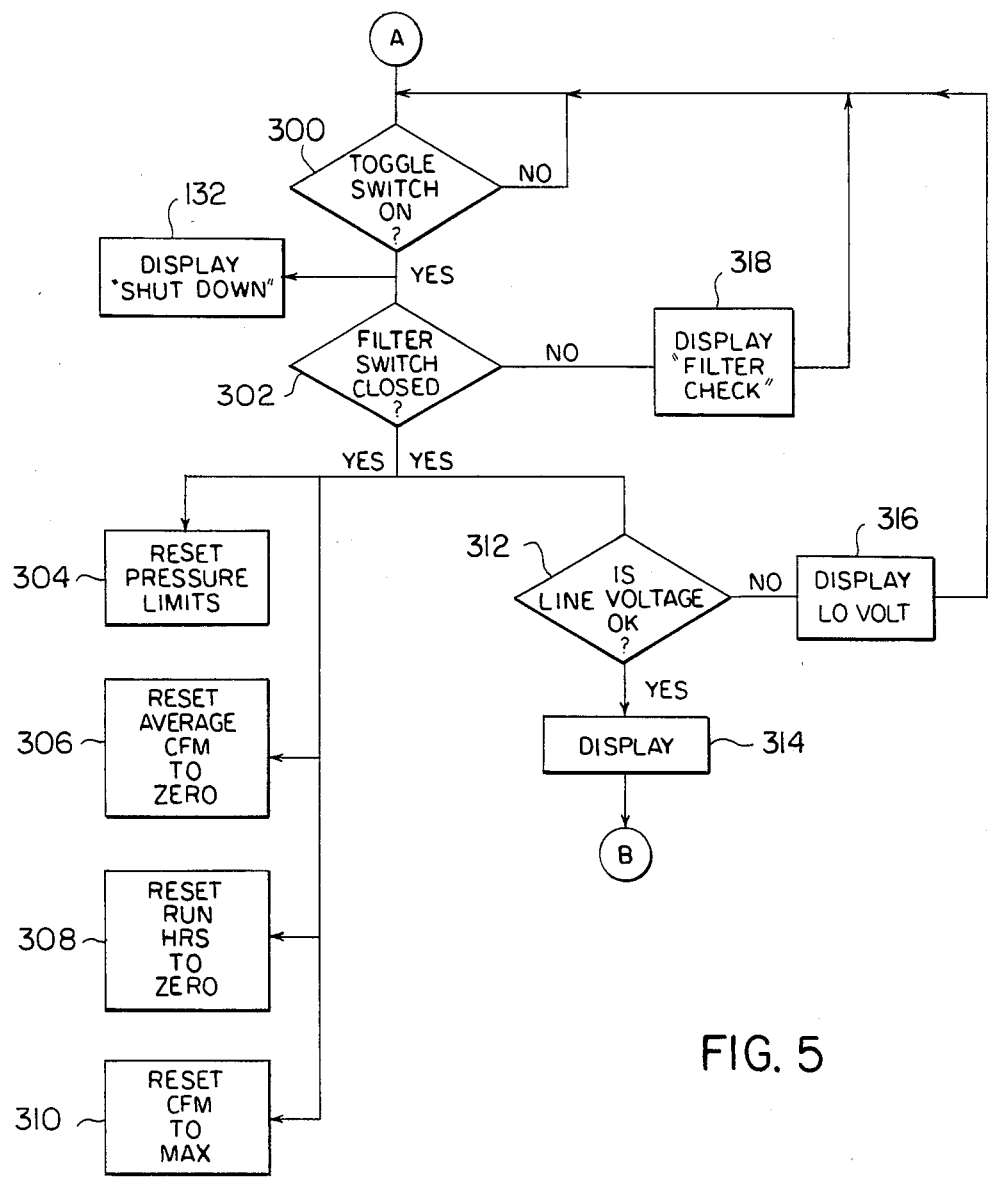
FIGS. 5-9 are functional flow charts of the operation of the control and display system of the present invention.

Operation of the system will now be described with reference to the flow charts beginning with FIG. 5. Upon actuation of the toggle switch 140, the system powers up (decision block 300) the annunciator light 132 is actuated and the CPU checks to see if the filter switch 42 is closed (block 302). That is, the CPU, via the data/address bus, checks the filter switch 42 for a logical one signal, which indicates the HEPA filter is properly positioned. In the event that the filter switch is not closed, i.e., in a logical zero state, (decision block 302) the system displays, on display unit 102, an indication to check the filter (block 318) and returns to the starting condition. If the switch is closed, (decision block 302) the system proceeds as follows. First, the CPU internally resets the high and low pressure limits (decision block 304. That is, if any pressure limits were programmed into the random access memory by the operator of the system in a prior usage, the pressure limits are reset to their initial, or default, values as stored in the read only memory. Similarly, the CPU initializes any average cubic feet per minute (CFM) values that may have been stored in memory locations in the random access memory to zero (decision block 306), resets the run hours to zero (decision block 308), and resets any CFM values that the operator may have selected in a prior usage to the maximum CFM value corresponding to the maximum speed of the blower motor (decision block 310).

Similarly, the CPU 200 reads the line voltage and checks if the line voltage is satisfactory (decision block 312). That is, the CPU reads the line voltage over data/address bus 202 from the STC 220, compares it to a predetermined minimum voltage value stored in the read only memory and, if the line voltage is greater than this value, proceeds to display indicia, over the display unit 102, that the system is ready to start running (block 314). In the event the line voltage is not greater than the predetermined minimum value, the display unit will display "low voltage" or other similar indicia and return back to the starting condition until the voltage problem is cleared up (decision block 316).

If the HEPA filter is properly positioned such that the filter switch 42 is closed (block 302 affirmative) and the line voltage is satisfactory (block 312 affirmative), then, after initializing all of the values as discussed above, the operating system proceeds to FIG. 6 where the system continues as follows.

The CPU checks to see if the run switch 104 is in a run position (decision block 320). If not, the system returns to the start of FIG. 5. If the run switch 320 has been depressed to the run mode, the CPU checks if the motor has been turned on, i.e., checks if the SCR 222 has been activated to supply line voltage to the motor. The voltage to the motor may be determined by reading the voltage from the STC 227. If the motor is on (decision block 322 is affirmative), the annunciator light 130 displays "normal" (block 324) and an internal clock within the CPU starts counting or timing (block 326). If the motor is not on, the motor is started (decison block 328) by the CPU writing to the STC 220 which, in turn, controls the motor speed control SCR 222 to provide line voltage to the blower motor 52 at its maximum voltage value.

The CPU then checks to see if the preset time period for the motor to be running has expired (decision block 328). That is, if the system is in the "auto" mode, the motor is operable for either a time period selected by the operator, as will be described, or for a predetermined default time as programmed in the read only memory. If the time has expired, the system stops the motor (block 330) and returns to the initial condition. If time out has not occurred, the system continues to read and calculate various parameters, as discussed below.

During the normal operation of the filtration unit, the CPU periodically reads the differential pressure values (via STC 220), and the voltage provided to the blower motor (via STC 227), and stores these values in memory (block 330). Further, the CPU determines, from the differential pressure value and blower motor voltage value that are sensed, the air flow rate value, in CFM, and also calculates the average CFM values over the present operating cycle of the unit. The conversion from differential pressure to air flow rate in CFM, for a particular blower motor voltage, will be discussed further below. In accordance with the selection made by the operator of the filtration unit, via the key pads on the display panel 100, the display unit 102 will display either differential pressure, air flow rate in CFM, average air flow rate in CFM, or average differential pressure, as discussed above (block 332). Further, the CPU keeps track of the operating time of the blower motor (block 334), through the internal counter or timer within the CPU, and, depending upon the selection made by the operator, will display the hours that the unit is running in a particular cycle, as well as the total hours that the unit has run during its operating life (block 336).

During the operation of the unit, the CPU periodically checks the line voltage, via the STC 220 over data/address bus 202, in a manner as described above (decision block 338). If the voltage drops below the predetermined minimum value stored in read only memory, the display unit 102 will display a "check voltage" or similar message (block 340).

During the system operation, the CPU also periodically checks for high and low pressure to see if these high and low pressure limits are exceeded. Specifically, the CPU checks to see if the low pressure limit is "exceeded" (decision block 342). The CPU reads the differential pressure value, compares it to either the predetermined low pressure value stored in system read only memory or the low pressure value that is programmed by the operator (as discussed above). If the pressure sensed is below the low pressure limit, the CPU writes to the STC 220 to control the motor speed control SCR 222 to stop the blower motor 52 (block 344), the annunciator light for low pressure 136 is lit (block 346) and the display unit 102 displays "error" or other suitable message. The system then returns to its start condition until the low pressure problem is corrected. As an option, an audible alarm may be provided to be activated (block 348). (This alarm will be incorporated in the housing 44.) The CPU similarly checks to see if the instantaneous differential pressure exceeds the high pressure limits, either those pre-programmed in ROM, or those set by the operator (decision block 352). If the high pressure limit is exceeded, the annunciator light for the high pressure indication 134 is actuated (block 354), an audible alarm, if provided, is actuated (block 356) and an error indication is displayed over the display unit 102 (block 358). The blower motor is not stopped when the high pressure value is exceeded, whereas the motor is stopped if the pressure drops below the predetermined low pressure setting. Too low a pressure may be caused by a blocked discharge, which results in insufficient air movement. However, if pressure is too low, such is usually attributed to an improperly placed HEPA filter or a major rupture in the filter which would result in contamination being blown out of the filter unit. Shut down of the unit is thus necessary.

During the system operation, with the motor running, the CPU periodically checks to see if the operator had set the CFM value to be below the maximum value, corresponding to maximum motor speed (decision block 360). If not, which means that the blower motor is at its maximum motor speed, the program returns to the start of FIG. 6 and the CPU then reads, calculates and displays, as discussed above. If, on the other hand, the operator of the unit had set the air flow rate, in CFM, to a lesser value, the program routine continues. As will be discussed further below, the operating system converts the CFM value that had been selected by the operator to a differential pressure, and such set differential pressure value is retained in memory. If the CPU confirms that the operator had set the CFM below the maximum value (decision block 360), the CPU will then read the instantaneous differential pressure and the motor speed (proportional to motor voltage) (block 362), calculate the actual CFM from these sensed pressure and motor voltage values, and determine if the actual CFM is equal to, or at, the CFM value selected by the operator (decision block 364). If it is no, the motor speed is changed (block 366). The CPU continues to read the differential pressure and motor voltage and to calculate the instantaneous CFM (block 362), determines if the CFM is at the value selected by the operator and continues to adjust the motor speed until the actual CFM is equal to the value set by the operator. When this point is reached, the system returns (block 365) to the top of the flow chart of FIG. 6. To summarize, when the the operator has selected the air flow rate to be below the maximum value corresponding to maximum motor speed, the CPU monitors the differential pressure and motor voltage and automatically adjusts the blower motor speed (by altering the blower motor voltage) until the actual air flow rate (in CFM) equals the particular CFM value that was selected by the operator.

The relationship between the differential, or static, pressure within the housing, the motor speed, and the air flow rate, in CFM, through the housing will now be discussed. The system as described herein does not sense or detect the air flow rate directly, but rather, detects or senses only the differential pressure from the pressure sensor 212, via STC 220, and the motor voltage, which is proportional to the motor speed, via the STC 227. Thus, some method or procedure for converting the sensed differential pressure and motor voltage to an air flow rate (in CFM) must be provided so that the CFM value, and average CFM value can be displayed. Further, because the operator of the unit is primarily interested in the air flow rate of the filtration unit (in CFM), and because the unit enables the operator to change the desired CFM from a maximum value to a lesser value, the system must have some means for converting the selected CFM input information to a differential pressure value for a particular motor voltage (speed) value so that the CPU can then adjust the motor speed accordingly. This conversion between differential pressure, motor speed, and air flow rate (CFM) can be obtained from the performance curves of the blower, derived from the fan laws of the blower or empirically.

Figure 10:
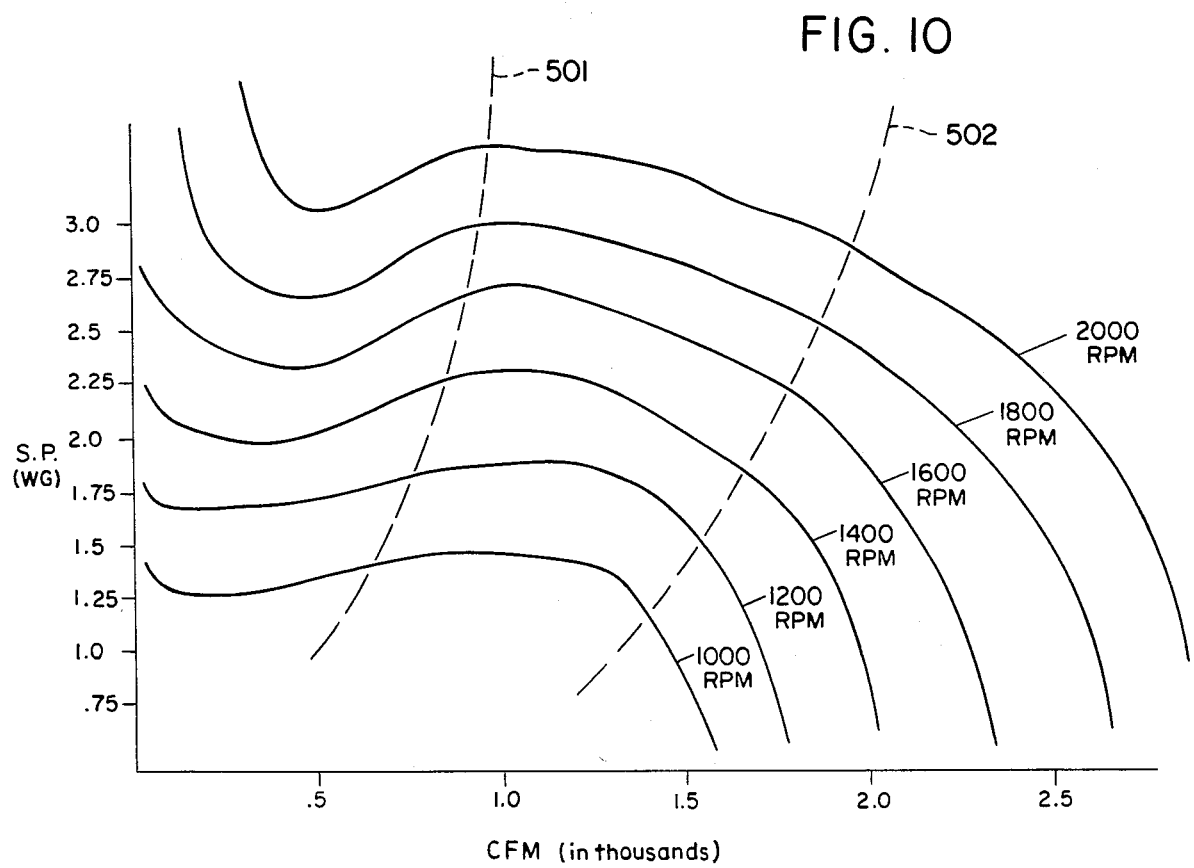
FIG. 10 is a graphical representation of a blower performance curve.

The performance curve for a typical forward curved centrifugal blower is exemplified in FIG. 10. The depicted static, or differential, pressure (S.P.) values, CFM values, and speed values (in RPM) shown in FIG. 10 are arbitrary and were selected for exemplary purposes, rather than being representative of any specific blower. The performance curve can readily be obtained from the manufacturer of the blower. In essence, the performance curve provides a relationship between the static, or differential, pressure and the air flow rate for a given blower speed (in RPM). Once the performance of a blower has been determined at one speed, the performance at other speeds is predictable within close limits from the fan laws. As is well known in the art, the efficient operating range of a blower lies between the dashed lines 501, 502 as shown in FIG. 10. Within this range, the relationship between pressure, speed, and flow rate can readily be determined and stored in memory through conventional techniques. For example, mathematical algorithms can be derived or look-up tables may be stored in ROM representative of the relationships between the three values.

Figure 6:
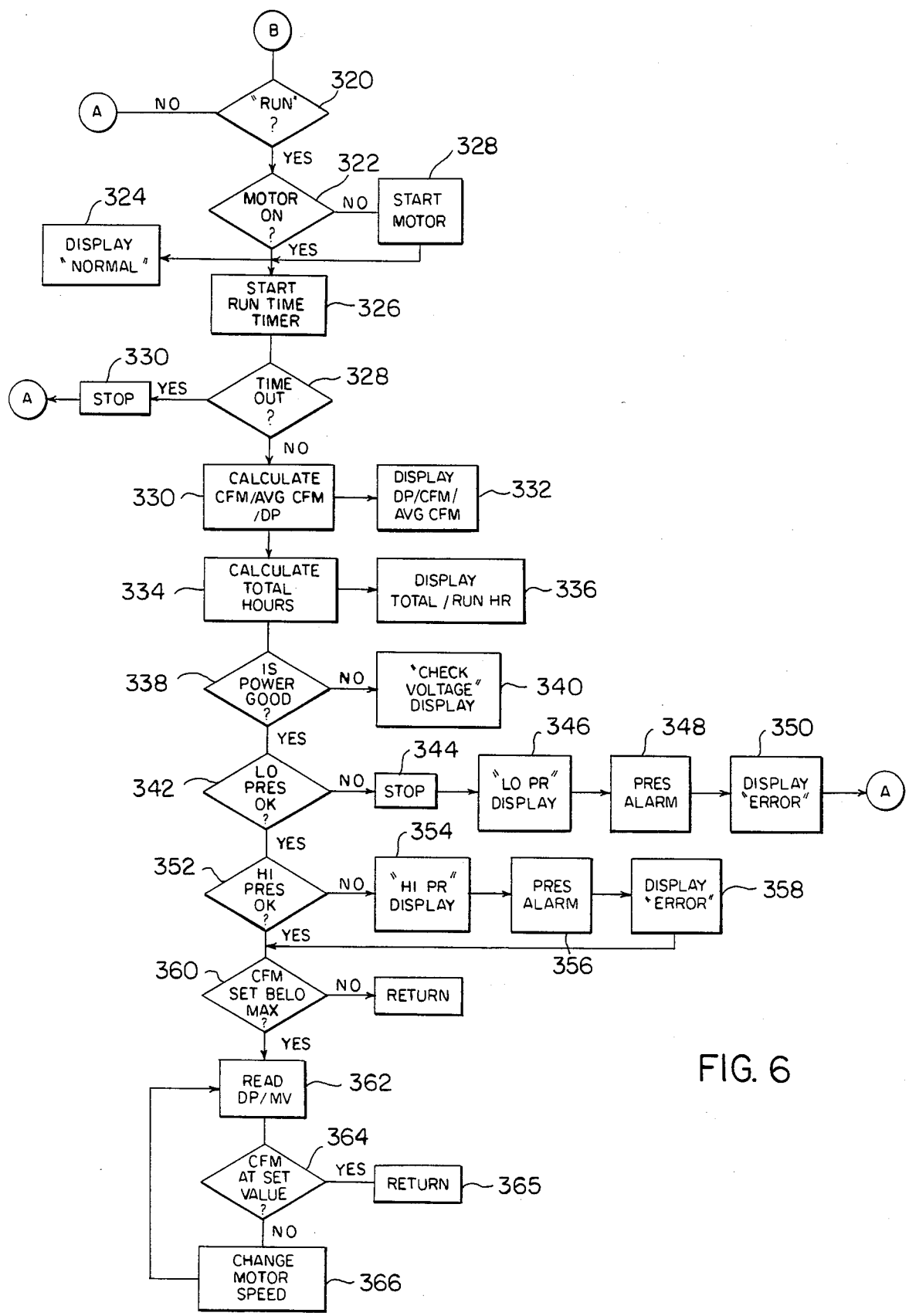
Figure 7:
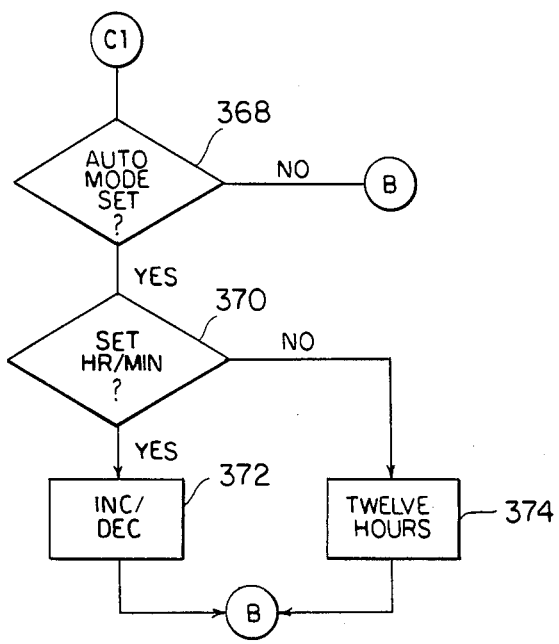

FIG. 7 is a functional flow chart of the operation of the automatic mode as set by the operator. When the auto key pad 106 is pushed, the CPU program of FIG. 6 is interrupted and the CPU affirms that the auto mode key pad is set (decision block 368). The CPU then checks to see if the set hour and set minute key pad switches 128, 124 are set (decision block 370). If they are set, and the operator increments or decrements the hour and minute values via the key pad switches 118, 121, as discussed above, the CPU reads the incremented or decremented values set (block 372). These values are then stored in the system memory. When these preset hour and minute values are reached (decision block 328 in FIG. 6) the motor is stopped (block 330). If, on the other hand, the operator does not increment or decrement the set hour or minute values, the CPU reverts to the pre-programmed default value, which is shown in block 374 as 12 hours, merely as an example. The CPU, after reading and storing the time period that the unit is to operate then goes back to the program as functionally depicted in FIG. 6.

Figure 8:
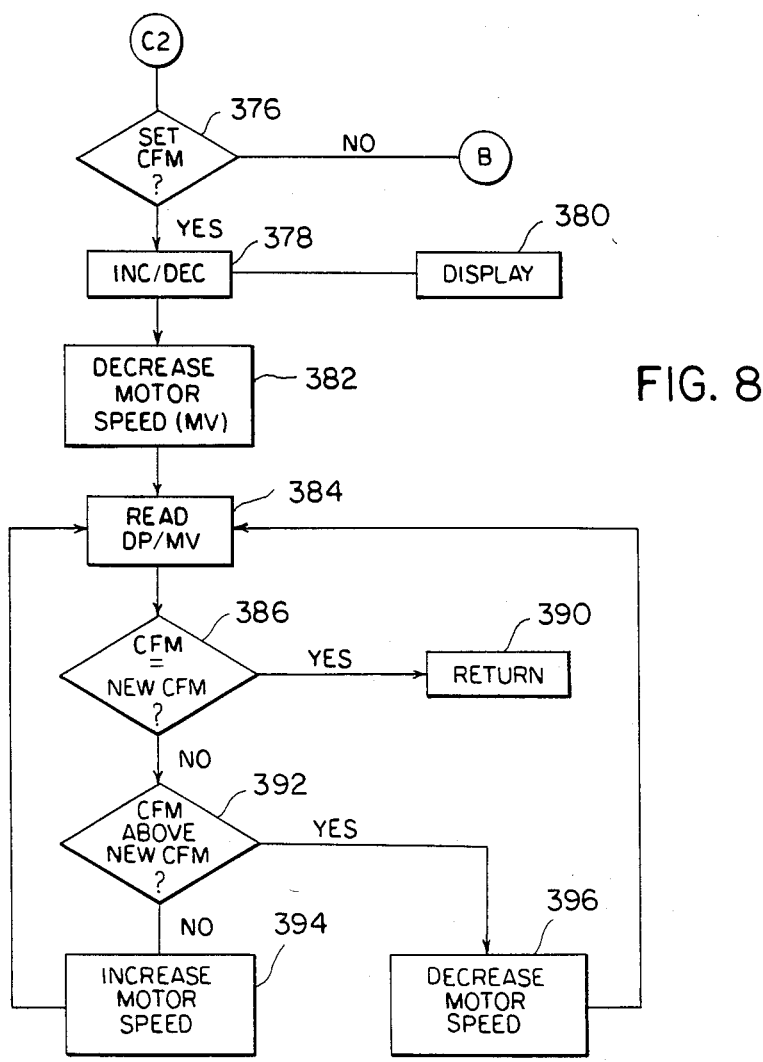

FIG. 8 is a functional flow chart of the interrupt routine initiated when the operator of the system depresses the "Set CFM" key pad 108 to set the air flow rate (in CFM) to a level below the maximum CFM when the motor speed is at its maximum value. Upon depressing the "Set CFM" switch, the CPU checks that the switch is set (decision block 376) and then reads the new CFM value set by the operator through the increment/decrement key pad switches (block 378). The operator observes the changing CFM values which are displayed on the display unit 102 (block 380) until the desired value is reached. The CPU then decreases the motor speed (block 382), by writing to the STC 220 as previously described. The CPU then reads the differential pressure value via the STC 220 and the motor voltage (speed) in a manner as previously described and converts these values to determine the actual CFM, using the data relationship of FIG. 10 (block 384). The CPU then checks if the actual CFM value is equal to the CFM value as "selected" by the operator (decision block 386). If these values are equal, the system returns to the main routine of FIG. 6 (block 390). If the selected CFM value does not equal the value that is sensed, the CPU determines if the actual CFM value sensed is above the CFM value selected by the operator (decision block 392). If the actual CFM value sensed is above the new CFM value, the CPU continues to decrease the motor speed (block 396) in a manner as previously described, and continues to compare the CFM value selected by the operator to the actual CFM value sensed until these values are equal (decision block 386) at which time the system returns to FIG. 6. If, on the other hand, decision block 392 results in a negative determination, i.e., the actual CFM value read is not above (i.e. below) the new CFM value as selected by the operator, the CPU then increases the motor speed (block 394) and the system loops back to continuously compare the actual CFM value sensed with the value selected by the operator. When such values are equal (decision block 386) the system returns to the main routine as depicted in the flow chart of FIG. 6.

Figure 9:
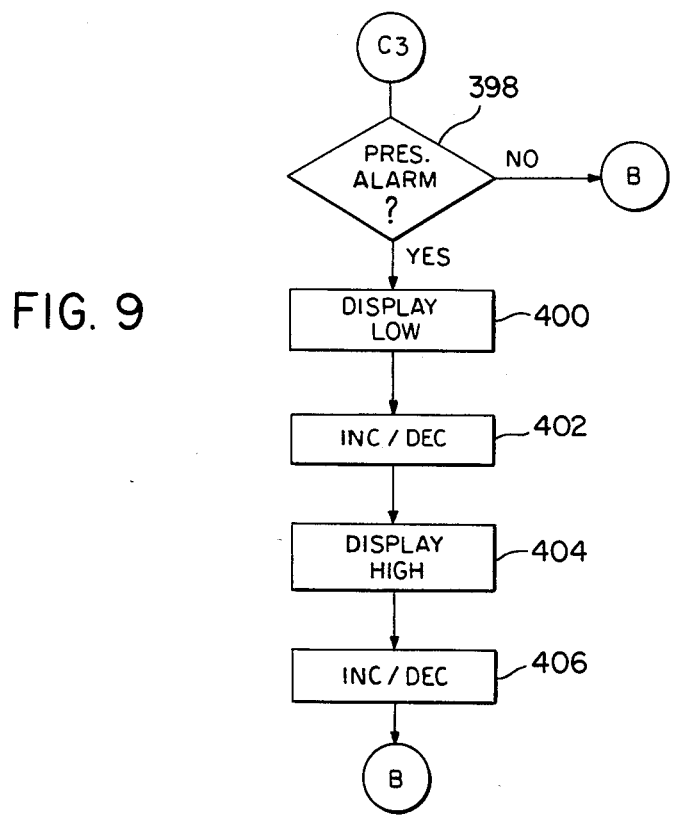

FIG. 9 is a functional flow chart of the interrupt routine that takes place when the operator of the system depresses the "Pres. Alarms" key pad switch 114 to set the high and low pressure limits. The CPU first determines that the pressure alarm key pad is depressed (decision block 398) and, if so, displays the present low pressure limit (block 400). The operator operates the increment and decrement switches 118 and 121 to change the low pressure limit value (block 402), which is read by the CPU, and the new low pressure limit value is stored in the system memory. Similarly, the system then displays the high pressure limit value (block 404) and the operator increments or decrements this value, which is read and stored in memory (block 406). Once these new limit values are read and stored in the system memory, the system returns to the flow chart of FIG. 6.

Although the invention has been described in connection with specific embodiments, it is to be clearly understood that this description is made only by way of example and not of limitation to the scope of the invention as set forth in the following claims. For example, a filtration unit may be designed to operate only at a fixed blower motor speed. In such case, only a single motor speed curve, of the type shown in FIG. 10, need be stored in memory. Manual selection and control of air flow rate will not be possible. In such an embodiment, the CPU will only need to sense, or read, the differential pressure to determine, and then display, the corresponding air flow rate, in CFM.

What is claimed is:

1. In a filtration device for filtering airborne contaminents, such as airborne asbestos fibers, from the air, said filtration device including a housing having an inlet for receiving contaminated air and an outlet for expelling filtered air outside the housing, a filter means within said housing including a HEPA filter in sealed communication across said inlet, a blower means within said housing for drawing air through said filter means and for expelling the filtered air through the outlet to the outside of the housing, the improvement comprising, piezoelectric pressure sensing means for sensing the differential air pressure within said housing, downsteam of said filter means, from the air pressure outside of the housing, and for providing an electrical output signal indicative of the differential air pressure, processing means for reading the differential air pressure output signal, determining the air flow rate through said housing based upon the differential air pressure output signal, calculating the average air flow rate through said housing during an operative period of the filtration unit blower means, timing an operative period of the filtration unit blower means, and for providing differential air pressure, air flow rate, average air flow rate, and operative time period information to an alphanumeric display means;

alphanumeric display means for visually displaying information processed and provided by said processing means;

manual control input means for selectively controlling the processing means to provide differential air pressure, air flow rate, average air flow rate, and operative time period information to said alphanumeric display means.

2. The filtration device as claimed in claim 1 further comprising a memory means for storing a plurality of differential air pressure values corresponding to a plurality of air flow rate values, and wherein said processing means looks up and retrieves from said memory means a particular air flow rate value corresponding to the differential air pressure output signal that is read by the processing means.

3. The filtration device as claimed in claim 1 further comprising blower speed detection means for detecting the speed of said blower means and providing an electrical output signal indicative of the blower speed, and wherein said processing means includes means for reading the electrical output signal indicative of the blower speed and for determining the air flow rate through said housing based upon the differential air pressure output signal and the blower speed output signal.

4. The filtration device as claimed in claim 3 further comprising a memory means for storing performance curve data indicative of the relationship between differential air pressure, blower speed, and air flow rate, and wherein said processing means retrieves from said memory means a particular air flow rate corresponding to the differential air pressure output signals and the blower speed output signals that are read by the processing means.

5. The filtration device as claimed in claim 1 further comprising memory means for storing upper and lower differential pressure limits, and annunciator means for indicating excessive high and low differential pressures, and wherein said processing means includes means for comparing the differential air pressure read from the piezoelectric pressure sensing means with said upper and lower differential pressure limits stored in said memory means, and for actuating said annunciator means when the differential air pressure read is greater than the upper pressure limit or lower than the lower pressure limit.

6. The filtration device as claimed in claim 5 wherein said manual control input means includes means for selectively changing the upper and lower differential pressure limits stored in said memory means.

7. The filtration device as claimed in claim 3 further comprising blower speed control means connected with said blower means and said processing means for controlling the blower speed of said blower means in accordance with data provided by said processing means.

8. The filtration device as claimed in claim 7 wherein said manual control input means includes means for selecting an air flow rate, and wherein said processing means reads the selected air flow rate provided by said manual control input means and provides blower speed control signals to said blower speed control means to alter the blower speed until the differential air pressure read from said piezoelectric pressure sensing means and the blower speed from the blower speed detection means corresponds to said selected air flow rate.

9. The filtration device as claimed in claim 8 wherein said processing means periodically reads the differential air pressure from said piezoelectric pressure sensing means and the blower speed from the blower speed detection means, calculates the air flow rate based on such values, compares the calculated air flow rate to the value corresponding to said selected air flow rate, and provides blower speed control signals to said blower speed control means to alter the motor speed until the actual air flow rate equals the selected air flow rate value.

10. The filtration device as claimed in claim 7 further comprising an input to said processing means indicative of the line voltage provided to said blower means, and wherein said processing means compares the line voltage to a predetermined minimum line voltage value, and wherein said processing means actuates said blower speed control means to activate the blower means if said line voltage exceeds the minimum line voltage value.

11. A filtration device for filtering airborne contaminants, such as airborne asbestos fibers, from the air comprising,
a housing having an air inlet and an air outlet;
filter means within said housing in sealed engagement with said air inlet such that all of the inlet air passes through said filter means;
blower means within said housing for drawing air through said filter means and for expelling air through the air outlet of the housing;
pressure sensing means associated with said housing for sensing the differential air pressure within said housing, downstream of the filter means, with the air pressure outside of the housing, and for providing an electrical output signal indicative of the differential air pressure;
central processing means connected with said pressure sensing means, and with a memory means and a visual display means via a data/address bus;
memory means for storing air flow rates as a function of differential air pressures; and
visual display means for visually displaying data provided by said central processing means;
wherein said central processing means reads the differential air pressure from said pressure sensing means, determines the air flow rate corresponding to said differential air pressure from said memory means, and provides data corresponding to said air flow rate to said visual display means.

12. The filtration device as claimed in claim 11 wherein said memory means includes means for storing upper and lower differential pressure limit values and wherein said central processing means includes means for comparing the differential air pressure read from the pressure sensing means with said upper and lower differential pressure limit values and for providing data to said visual display means when the limits are exceeded.

13. The filtration device as claimed in 12 further comprising manual control input means for providing data input to said central processing means, said manual control input means including means for inputting upper and lower differential pressure limit values, said central processing means including means for storing such data in said memory means.

14. The filtration device as claimed in claim 11 further comprising an electrical power source connected to said blower means via a blower control means for controlling the electrical power provided to said blower means, said blower control means connected with said central processing means, and wherein said manual control input means includes means for providing control data to said processing means for controlling the blower control means.

15. The filtration device as claimed in claim 14 wherein said electrical power source is connected with said central processing unit, and wherein said central processing unit reads the voltage provided by said power source and provides an enable signal to said blower control means when said power line voltage exceeds a predetermined voltage level.

16. The filtration device as claimed in claim 11 further comprising blower speed sensing means for sensing the blower speed and for providing an electrical output signal indicative of the blower speed, and wherein said central processing means is connected with said blower speed sensing means via said data/address bus, and wherein said central processing means reads the blower speed from said blower speed sensing means and determines the air flow rate corresponding to the differential air pressure and the blower speed.

* * * * *